(12) United States Patent
Edge et al.

(10) Patent No.: US 11,350,271 B2
(45) Date of Patent: May 31, 2022

(54) LOCATION OF A MOBILE DEVICE WITH 5G WIRELESS ACCESS USING SUPL

(71) Applicant: QUALCOMM Incorporated, San Diego, CA (US)

(72) Inventors: Stephen William Edge, Escondido, CA (US); Srigouri Kamarsu, Cupertino, CA (US); Ie-Hong Lin, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 16/588,978

(22) Filed: Sep. 30, 2019

(65) Prior Publication Data
US 2020/0120490 A1 Apr. 16, 2020

Related U.S. Application Data

(60) Provisional application No. 62/745,980, filed on Oct. 15, 2018.

(51) Int. Cl.
*H04W 12/00* (2021.01)
*H04W 12/033* (2021.01)
(Continued)

(52) U.S. Cl.
CPC ......... *H04W 12/033* (2021.01); *H04W 4/029* (2018.02); *H04W 12/63* (2021.01); *H04W 12/77* (2021.01); *H04W 80/10* (2013.01)

(58) Field of Classification Search
CPC ....... H04L 67/141; H04L 69/08; H04L 69/18; H04W 12/73; H04W 4/02; H04W 4/025; H04W 64/00
See application file for complete search history.

(56) References Cited

U.S. PATENT DOCUMENTS

| 2012/0142313 A1 | 6/2012 | Edge | |
| 2013/0212663 A1* | 8/2013 | Edge | H04W 8/02 726/7 |

(Continued)

OTHER PUBLICATIONS

Busin A., et al., "Supl 2.0 TS I LP 5G Location", OMA-LOC-2018-0003R01-CR_SUPL2.0_TS_ILP_5G_Location, Open Mobile Alliance (OMA), 4330 La Jolla Village Dr., Suite 110 San Diego, CA 92122, USA, Sep. 28, 2018, (Sep. 28, 2018), XP064193007, pp. 1-17, Retrieved from the Internet: URL:ftp/Public_documents/LOC/2018/, [retrieved on Oct. 9, 2018], Sections 1. 12.5 (Location ID), 12.5.9 (NR Cell Info).

(Continued)

*Primary Examiner* — Mansour Oveissi
(74) *Attorney, Agent, or Firm* — Weaver Austin Villeneuve & Sampson LLP

(57) ABSTRACT

Techniques described herein provide means by which cell information indicative of a location of a UE may be conveyed to a location server over a 5G NR data connection using a SUPL message with an LTE cell ID data field. In some embodiments, for example, the UE may include the Cell ID of a LTE neighbor cell or information regarding a 5G NR serving cell, such as a portion of the 5G NR Cell ID or a reserved value or sequence identifying the 5G NR serving cell. The techniques may be applicable to the Secure User Plane Location (SUPL) solution defined by OMA and may enable a UE and a SUPL Location Platform (SLP) to support location of the UE using a version of SUPL without explicit support of 5G NR wireless access.

26 Claims, 7 Drawing Sheets

(51) Int. Cl.
  *H04W 80/10* (2009.01)
  *H04W 4/029* (2018.01)
  *H04W 12/63* (2021.01)
  *H04W 12/77* (2021.01)

(56) References Cited

U.S. PATENT DOCUMENTS

| | | | | |
|---|---|---|---|---|
| 2015/0071172 | A1* | 3/2015 | Ghozati | H04L 67/1021 |
| | | | | 370/328 |
| 2015/0266377 | A1 | 9/2015 | Hampiholi et al. | |
| 2018/0063701 | A1* | 3/2018 | Jin | H04W 8/22 |
| 2019/0124617 | A1* | 4/2019 | Jones | G01S 5/12 |
| 2019/0268833 | A1* | 8/2019 | Kwok | H04W 16/14 |

OTHER PUBLICATIONS

Edge S., et al., "Supl 2.0 TS 5G Location", OMA-LOC-2018-0002R01_CR_SUPL2.0_TS_ULP_5G_Location, Open Mobile Alliance (OMA), 4330 La Jolla Village Dr., Suite 110 San, CA 92122, USA, Sep. 28, 2018, (Sep. 28, 2018), XP064193004, pp. 1-58, Retrieved from the Internet: URL:ftp/Public_documents/LOC/2018/, [retrieved on Sep. 29, 2018], Section 1, Section 10.10, Table 2. last item (supported bearers: NR), Section 10.11, Table 3 (Location ID ParameterCell Info compr ising NR info support), Section 10.11.9, NR Cell Info.

International Search Report and Written Opinion—PCT/US2019/054158—ISA/EPO—dated Jan. 21, 2020.

"UserPlane Location Protocol, OMA-TS-ULP-V2_0_4—Feb. 8, 2017—D", OMA-TS-ULP-V2_0_4—Feb. 8, 2017—D, Open Mobile Alliance (OMA), 4330 La Jolla Village Dr., Suite 110 San Diego, CA 92122, USA, No. 2.0.4, Feb. 8, 2017, (Feb. 8, 2017), XP064190594, pp. 1-390, Retrieved from the Internet: URL:ftp/Public_documents/LOC/Permanent_documents/, [retrieved on Feb. 9, 2017], Section 5.1.1, Section 5.2.1, figures 1,46 Section 10.11, Section 10.11.3, Section 11.2. 4.

* cited by examiner

LOCATION OF A MOBILE DEVICE WITH 5G WIRELESS ACCESS USING SUPL

RELATED APPLICATIONS

This application claims the benefit of U.S. Provisional Application No. 62/745,980, filed Oct. 15, 2018, entitled "LOCATION OF A MOBILE DEVICE WITH 5G WIRELESS ACCESS USING SUPL," which is assigned to the assignee hereof, and incorporated herein in its entirety by reference.

BACKGROUND

Obtaining the location of a mobile device, or user equipment (UE), that is accessing a wireless network may be useful or necessary for many applications including, for example, emergency calls, personal navigation, asset tracking, locating a friend or family member, etc. Secure User Plane Location (SUPL) is one technology that may be utilized by the wireless network to locate a UE including transferring assistance data and positioning measurements over a wireless network to aid in the determination of the location of the UE.

As an example, it may be useful or necessary to locate a UE that has access to a Fifth Generation (5G) New Radio (NR) network. However, there may be problems or limitations when a UE or SUPL Location Platform (SLP) does not support location of the UE according to a standard SUPL solution for 5G wireless access. Means to overcome such problems or limitations may thus be useful.

BRIEF SUMMARY

Techniques described herein address these and other issues by providing means by which usable cell information may be conveyed over a 5G NR data connection using a SUPL message with a Long-Term Evolution (LTE) cell ID data field. In some embodiments, for example, the UE may include the Cell ID of an LTE neighbor cell or information regarding the 5G NR serving cell, such as a portion of the 5G NR Cell ID or a reserved value or sequence identifying the 5G NR serving cell.

An example method at a UE of supporting location of the UE using a SUPL session over a 5G NR data connection, according to the description, comprises establishing the 5G NR data connection between the UE and a SUPL Location Platform (SLP), determining cell data, wherein the cell data comprises information regarding a 5G NR serving cell of the UE, or a Long-Term Evolution (LTE) neighbor cell, or a combination thereof. The method further comprises sending a SUPL message to the SLP as part of the SUPL session, wherein the SUPL message comprises a Location ID (LID) parameter having a Long-Term Evolution (LTE) Cell Information data field, and wherein the cell data is included in the LTE Cell Information data field.

An example method at an SLP of supporting location of a UE using a SUPL session over a 5G NR data connection, according to the description, comprises establishing the 5G NR data connection between the SLP and the UE, and receiving a SUPL message from the UE as part of the SUPL session, wherein the SUPL message comprises a Location ID (LID) parameter having a Long-Term Evolution (LTE) Cell Information data field, wherein the cell data is included in the LTE Cell Information data field, and the cell data comprises information regarding a 5G NR serving cell of the UE, or an LTE neighbor cell, or a combination thereof. The method further comprises determining a location of the UE based at least in part on the cell data.

An example UE, according to the description, comprises a communication interface, a memory, and one or more processing units communicatively coupled with the memory and the communication interface. The one or more processing units are further configured to establish, using the communication interface, a 5G NR data connection between the UE and an SLP, and determine cell data, wherein the cell data comprises information regarding a 5G NR serving cell of the UE, or a Long-Term Evolution (LTE) neighbor cell, or a combination thereof. The one or more processing units are further configured to send, using the communication interface, a SUPL message to the SLP as part of a SUPL session, wherein the SUPL message comprising a Location ID (LID) parameter having a Long-Term Evolution (LTE) Cell Information data field, wherein the cell data is included in the LTE Cell Information data field.

An example SLP, according to the description, comprises a communication interface, a memory, and one or more processing units communicatively coupled with the communication interface and the memory. The one or more processing units are configured to establish, using the communication interface, a 5G NR data connection between the SLP and a UE, and receive, using the communication interface, a SUPL message from the UE as part of a SUPL session, the SUPL message comprising a Location ID (LID) parameter having an LTE Cell Information data field, wherein cell data is included in the LTE Cell Information data field, and the cell data comprises information regarding a 5G NR serving cell of the UE, or an LTE neighbor cell, or a combination thereof. The one or more processing units are further configured to determine a location of the UE based at least in An example mobile device, according to the description, comprises means for establishing a 5G NR data connection between the mobile device and an SLP, and means for determining cell data, wherein the cell data comprises information regarding a 5G NR serving cell of the mobile device, or a Long-Term Evolution (LTE) neighbor cell, or a combination thereof. The mobile device further comprises means for sending a SUPL message to the SLP as part of the SUPL session, wherein the SUPL message comprises a Location ID (LID) parameter having a Long-Term Evolution (LTE) Cell Information data field, wherein the cell data is included in the LTE Cell Information data field.

An example computer server, according to the description, comprises means for establishing a 5G NR data connection between the computer server and a UE, and means for receiving a Secure User Plane Location (SUPL) message from the UE as part of a SUPL session, wherein the SUPL message comprises a Location ID (LID) parameter having a LTE Cell Information data field, wherein cell data is included in the LTE Cell Information data field, and the cell data comprises information regarding a 5G NR serving cell of the UE or an LTE neighbor cell. The computer server further comprises means for determining a location of the UE based at least in part on the cell data.

An example non-transitory computer-readable medium, according to the description, has instructions embedded thereon for supporting location of a UE using a SUPL session over a 5G NR data connection. The instructions, when executed by one or more processing units of the UE, cause the UE to establish the 5G NR data connection between the UE and a SLP, and determine cell data, wherein the cell data comprises information regarding a 5G NR serving cell of the UE, or a Long-Term Evolution (LTE)

neighbor cell, or a combination thereof. The instructions, when executed by one or more processing units of the UE, further cause the UE to send a SUPL message to the SLP as part of the SUPL session, the SUPL message comprising a Location ID (LID) parameter having an LTE Cell Information data field, wherein the cell data is included in the LTE Cell Information data field.

Another example non-transitory computer-readable medium, according to the description, has instructions embedded thereon for supporting location of a UE using a SUPL session over a 5G NR data connection. The instructions, when executed by one or more processing units of an SLP, cause the SLP to establish the 5G NR data connection between the SLP and the UE, and receive a SUPL message from the UE as part of the SUPL session, wherein the SUPL message comprises a Location ID (LID) parameter having a Long-Term Evolution (LTE) Cell Information data field. The cell data is included in the LTE Cell Information data field, and the cell data comprises information regarding a 5G NR serving cell of the UE or an LTE neighbor cell. The instructions, when executed by the one or more processing units of an SLP, further cause the SLP to determine a location of the UE based at least in part on the cell data.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments are described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

When a 5G NR network is used to support a SUPL location session between a UE and an SLP, problems may arise in the case that standards-based SUPL support for 5G location (e.g. according to a latest standard for SUPL 2.0 published by the Open Mobile Alliance (OMA)) is not implemented by the UE or SLP. As an example, a UE may not be able to send information to an SLP identifying a current 5G serving cell for the UE or providing location measurements for the 5G serving cell or neighboring 5G cells. This may prevent an SLP from obtaining a coarse location estimate for the UE, which may in turn make a more accurate location estimate difficult or impossible to obtain. Techniques provided herein can overcome these issues by providing means by which usable cell information for 5G NR may be conveyed over a 5G NR data connection using a SUPL message with a cell ID data field applicable to Fourth Generation (4G) Long Term Evolution (LTE).

As referred to herein, the terms "New Radio," "Fifth Generation New Radio," "5G NR," and derivatives thereof refer to 5G technology as implemented in specifications for the Third Generation Partnership Project (3GPP). As a person of ordinary skill in the art would appreciate, various 5G technology standards are defined and revised by 3GPP.

Figure 1:
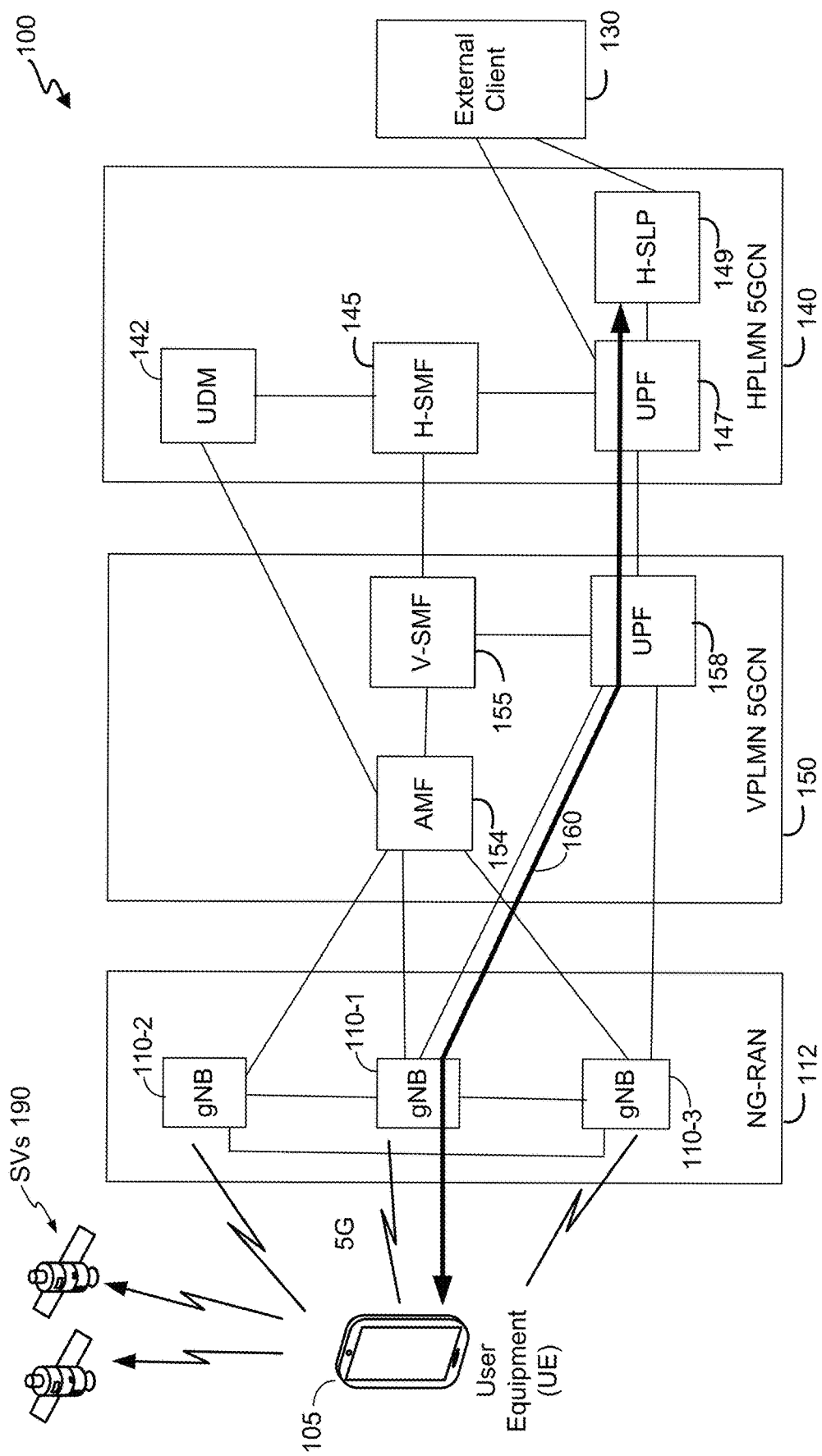
FIG. 1 is a diagram of a communication system, according to an embodiment.

FIG. 1 shows a diagram of an embodiment of a communication system 100 that may implement the techniques described herein for supporting a SUPL session (also referred to herein as a SUPL location session) over a 5G NR data connection. Here, the communication system 100 comprises a UE 105 and components of a 5G network, comprising a Next Generation (NG) Radio Access Network (RAN), or NG-RAN 112, a 5G Core Network (5GCN) 150 and a home network 5GCN 140. When home network 5GCN 140 is different to 5GCN 150, 5GCN 150 and NG-RAN 112 may belong to a visited network for UE 105. The home network 5GCN 140 is for a Home Public Land Mobile Network (HPLMN) for the UE 105 and communicates with the 5GCN 150 which may be for a Visited Public Land Mobile Network (VPLMN) that communicates with the UE 105. A 5G network may also be referred to as a New Radio (NR) network or as a 5G System (5GS); NG-RAN 112 may be referred to as an NR RAN or a 5G RAN; and 5GCN 140 and 150 may be referred to as an NG Core network (NGC). The communication system 100 may further utilize information from satellite vehicles (SVs) 190 for a Global Navigation Satellite System (GNSS) like the Global Positioning System (GPS), GLONASS, Galileo, Beidou or some other local or regional Satellite Positioning System (SPS) such as Indian Regional Navigation Satellite System (IRNSS), European Geostationary Navigation Overlay Service (EGNOS), or Wide Area Augmentation System (WAAS). Additional components of the communication system 100 are described below. The communication system 100 may include additional or alternative components.

It should be noted that FIG. 1 provides a generalized illustration of various components, any or all of which may be utilized as appropriate, and each of which may be duplicated or omitted as necessary. Specifically, although one UE 105 is illustrated, it will be understood that many UEs (e.g., hundreds, thousands, millions, etc.) may utilize the communication system 100. Similarly, the communication system 100 may include a larger or smaller number of SVs 190, gNBs 110, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105, as used herein, may be an electronic device and may be referred to as a device, a mobile device, a wireless device, a mobile terminal, a terminal, a wireless terminal, a mobile station (MS), a Secure User Plane Location (SUPL) Enabled Terminal (SET), or by some other name. Moreover, UE 105 may correspond to a cellphone, smartphone, laptop, tablet, personal data assistant (PDA), tracking device or some other portable or moveable device. In some cases, a UE 105 may be part of some other entity—e.g. may be a chipset supporting a modem that is integrated into some larger mobile entity such as a vehicle, drone, package, shipment, robotic device etc. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), Long Term Evolution (LTE), High Rate Packet Data (HRPD), IEEE 802.11 WiFi, Bluetooth® (BT), Worldwide Interoperability for Microwave Access (WiMAX), 5G NR (e.g., using the NG-RAN 112 and 5GCN 140, 150), etc. The UE 105 may also support wireless communication using a Wireless Local Area Network (WLAN) which may connect to other networks (e.g. the Internet) using a Digital Subscriber Line (DSL) or packet cable for example.

The UE 105 may include a single entity or may include multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, position estimate or position fix, and may be geodetic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

Base stations (BSs) in the NG-RAN 112 shown in FIG. 1 comprise NR NodeBs, also referred to as gNBs, 110-1, 110-2 and 110-3 (collectively and generically referred to herein as gNBs 110). Pairs of gNBs 110 in NG-RAN 112 may be connected to one another—e.g. directly as shown in FIG. 1 or indirectly via other gNBs 110. Access to the 5G network is provided to UE 105 via wireless communication between the UE 105 and one or more of the gNBs 110, which may provide wireless communication access to the 5GCN 150 on behalf of the UE 105 using 5G (e.g., NR). In FIG. 1, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105. Some gNBs 110 in FIG. 1 (e.g. gNB 110-2 or gNB 110-3) may be configured to function as positioning-only beacons which may transmit signals (e.g. a Positioning Reference Signal (PRS)) to assist positioning of UE 105 but may not receive signals from UE 105 or from other UEs.

As noted, while FIG. 1 depicts nodes configured to communicate according to 5G communication protocols, nodes configured to communicate according to other communication protocols, such as, for example, the LTE protocol, may be used. Such nodes, configured to communicate using different protocols, may be controlled, at least in part, by the 5GCN 150. Thus, the NG-RAN 112 may include any combination of gNBs, evolved Node Bs (eNBs) supporting LTE access, or other types of base stations or access points. As an example, NG-RAN 112 may include one or more next generation eNBs (ng-eNBs) which provide LTE wireless access to UE 105 and which may connect to gNBs 110 in NG-RAN 112 and/or to entities in 5GCN 150 such as an Access and Mobility Management Function (AMF) 154 and a User Plane Function (UPF) 158.

The gNBs 110 can communicate with the AMF 154. The AMF 154 may support mobility of the UE 105, including cell change and handover and may participate in supporting a signaling connection to the UE 105 and possibly helping establish and release Protocol Data Unit (PDU) sessions for UE 105. Other functions of AMF 154 may include: termination of a control plane (CP) interface from NG-RAN 112; termination of Non-Access Stratum (NAS) signaling connections from UEs such as UE 105, NAS ciphering and integrity protection; registration management; connection management; reachability management; mobility management; access authentication and authorization.

As illustrated, HPLMN 140 includes a Unified Data Management (UDM) 142 and a Home Session Management Function (SMF), H-SMF 145, that may be connected to a Visited SMF (V-SMF) 155 in the VPLMN 150 (e.g., via the Internet), as well as a User Plane Function (UPF) 147 that may be connected to a UPF 158 in the VPLMN 5GCN 150. The UDM 142 is analogous to a Home Subscriber Server (HSS) for LTE access, and if desired, the UDM 142 may be combined with an HSS. The UDM 142 is a central database that contains user-related and subscription related information for UE 105 and may perform the following functions: UE authentication, UE identification, access authorization, registration and mobility management, subscription management and Short Message Service (SMS) management. The UPF 147 and UPF 158 may each support voice and data bearers for UE 105 and may enable UE 105 voice and data access to other networks such as the Internet. UPF 147 and/or UPF 158 functions may include: external PDU session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering.

The UPF 147 may be communicatively connected to a location server (LS), such as a home SLP (H-SLP) 149 for UE 105. The H-SLP 149 may support the SUPL user plane (UP) location solution defined by the Open Mobile Alliance (OMA) and may support location services for UE 105 based on subscription information for UE 105 stored in H-SLP 149. In some embodiments of communication system 100, a Discovered SLP (D-SLP) or Emergency SLP (E-SLP) (not shown in FIG. 1), in or accessible from VPLMN 5GCN 150 (e.g. connected to UPF 158), may be additionally or alternatively used to locate UE 105 using the SUPL UP location solution.

In a UP location solution such as SUPL, signaling (e.g. such as SUPL messages carrying embedded LTE Positioning Protocol (LPP) and/or New Radio Positioning Protocol (NPP) messages) to support location of UE 105 may be transferred between participating entities (e.g. UE 105 and H-SLP 149) using data bearers (e.g. using the Internet Protocol (IP)).

The H-SMF 145 is responsible for session management and may allocate an IP address to UE 105. The H-SMF 145 can also select and control the UPF 147 for data transfer. The H-SMF 145 may be connected to UDM 142 for UE 105. The V-SMF 155 may similarly control UPF 158 and may help establish voice and data sessions for UE 105 in coordination with H-SMF 145. UPF 147 and/or H-SLP 149 may be connected to external client 130, e.g., through another network, such as the Internet.

It should be understood that while a VPLMN 150 and a separate HPLMN 140 are illustrated in FIG. 1, both PLMNs (networks) may be the same PLMN. In that case, (i) H-SLP 149, H-SMF 145 and UDM 142 may be in the same 5GCN as AMF 154, (ii) 5GCN 150 and 5GCN 140 may be the same 5GCN, (iii) V-SMF 155 and H-SMF 145 may be the same SMF, and (v) UPF 158 and UPF 147 may be the same UPF.

The H-SLP 149 may support positioning of the UE 105 when UE 105 accesses the NG-RAN 112 and may support position procedures/methods such as Assisted GNSS (A-GNSS), Observed Time Difference of Arrival (OTDOA), Real Time Kinematic (RTK), Precise Point Positioning (PPP), Differential GNSS (DGNSS), Enhanced Cell ID (ECID), angle of arrival (AOA), angle of departure (AOD), WLAN positioning and/or other position methods. The H-SLP 149 may also process location services requests for the UE 105, e.g., received from external client 130. It is noted that in some embodiments, at least part of the positioning functionality (including derivation of the location of UE 105) may be performed at the UE 105 (e.g., using signal measurements obtained by UE 105 for signals transmitted by wireless nodes such as gNBs 110, and assistance data provided to the UE 105, e.g. by H-SLP 149).

As further illustrated in FIG. 1, H-SLP 149 and UE 105 may communicate (e.g. using a data connection 160) which may support the transfer of SUPL messages containing positioning protocol messages for the LTE Positioning Protocol (LPP) defined in 3GPP TS 36.355 (or 3GPP TS 37.355). The LPP protocol may be used to support positioning of UE 105 using UE assisted and/or UE based position methods such as A-GNSS, RTK, OTDOA, ECID and/or WLAN positioning. An LPP message sent from the H-SLP 149 to the UE 105 (e.g. inside a SUPL POS message) may instruct the UE 105 to do any of a variety of things, depending on desired functionality. For example, the LPP message could contain an instruction for the UE 105 to obtain measurements for GNSS (or A-GNSS), WLAN, and/or OTDOA (or some other position method). In the case of OTDOA, the LPP message may instruct the UE 105 to obtain one or more measurements (e.g. Reference Signal Time Difference (RSTD) measurements) of PRS or other signals transmitted within particular cells supported by particular gNBs 110 (or supported by one or more ng-eNBs or eNBs). The UE 105 may send the measurements back to the H-SLP 149 in an LPP message (e.g. transported inside a SUPL POS message).

In some embodiments, LPP may be augmented by or replaced by an NR positioning protocol (NPP or NRPP) which supports position methods such as OTDOA and ECID for NR radio access. For example, an LPP message may contain an embedded NPP message or may be replaced by an NPP message.

As previously noted, a SUPL location session between the UE 105 and the H-SLP 149 may be utilized to obtain a location estimate for the UE 105, which may involve the transfer of assistance data and positioning measurements between the UE 105 and H-SLP 149 via a TCP/IP data connection, to aid in the determination of the location of the UE 105. An example data connection 160 for a SUPL session between UE 105 and H-SLP 149 is shown in FIG. 1 and passes through H-SLP 149, UPF 147, UPF 158, gNB 110-1 and UE 105, with SUPL messages potentially being transferred through each of these entities between UE 105 and H-SLP 149. The portion of data connection 160 that passes between UE 105 and gNB 110-1 may be supported by data transfer and signaling using 5G NR.

SUPL sessions may be network initiated (e.g., by the H-SLP 149, which may be in response to receiving a location request for UE 105 from an external client 130) or may be UE initiated (e.g. by UE 105). In either case, the UE 105 may need to send information related to a 5G NR serving cell for UE 105 to H-SLP 149, which may be included in a SUPL Location ID (LID) parameter in a SUPL message such as a SUPL POS INIT message. As noted in Table 1 below, the LID parameter can define the current serving cell, current serving WLAN AP or current serving WiMAX BS information of UE 105 (which is referred to in Table 1 as a SET).

The location ID parameter is defined by OMA in a Technical Specification (TS) for the SUPL UserPlane Location Protocol (ULP). The LID definition for ULP may be as shown in Table 1 below.

TABLE 1

| Location ID (LID) Parameter | | |
|---|---|---|
| Parameter | Presence | Value/Description |
| Location ID | — | Defines the current serving cell, current serving WLAN AP or current serving WiMAX BS information of the SET. |
| >Cell Info | M | The following cell IDs are supported: GSM Cell Info WCDMA/TD-SCDMA Cell Info CDMA Cell Info HRPD Cell Info Ultra Mobile Broadband (UMB) Cell Info LTE Cell Info WLAN AP Info WiMAX BS Info |
| >Status | M | Describes whether or not the cell, WLAN AP or WiMAX BS info is: Not Current, last known cell/Access Point (AP) info Current, the present cell/AP info Unknown (i.e. not known whether the cell/AP id is current or not current) |

As indicated in Table 1, the Location ID can include information, including information for a serving cell (also referred to as "Cell Info"). For LTE access by a UE 105, the Cell Info in a LID parameter can include LTE Cell Information (also referred to as LTE Cell Info, or as an LTE Cell Information data field), which may be as shown in Table 2.

TABLE 2

LTE Cell Info for a LID Parameter

| Parameter (Data Field) | Presence | Value/Description |
| --- | --- | --- |
| LTE Cell Info | — | LTE Cell ID. Parameter definitions in (e.g. as in 3GPP TS 36.321) |
| >CellGlobalIdEUTRA | M | |
| >>PLMN-Identity | M | |
| >>>MCC | M | Mobile Country Code, range: (0 . . . 999) |
| >>>MNC | M | Mobile Network Code, range: (0 . . . 999) |
| >>CI | M | Cell Identity, length 28 bits. |
| >PhysCellId | M | Physical Cell ID, range: (0 . . . 503) |
| >TrackingAreaCode | M | Tracking Area Code, length 16 bits |
| >RSRPResult | O | Reference Signal Received Power, range: (0 . . . 97) |
| >RSRQResult | O | Reference Signal Received Quality, range: (0 . . . 34) |
| >TA | O | Currently used Timing Advance value, range: (0 . . . 1282) ($N_{TA}/16$ as in 3GPP TS 36.213). |
| >Measured Results List EUTRA | O | Network Measurement Report for LTE (e.g. as in 3GPP TS 36.355). |
| >>PhysCellId | M | Physical Cell ID, range: (0 . . . 503) |
| >>cgi-Info | O | |
| >>>CellGlobalIdEUTRA | M | |
| >>>TrackingAreaCode | M | Tracking Area Code, length 16 bits |
| >>MeasResult | M | |
| >>>RSRPResult | O | Reference Signal Received Power, range: (0 . . . 97) |
| >>>RSRQResult | O | Reference Signal Received Quality, range: (0 . . . 34) |
| >>EARFCN | CV* | This parameter represents an Evolved Universal Terrestrial Radio Access (E-UTRA) Absolute Radio Frequency Channel Number (ARFCN). This parameter is conditional and is sent if cgi-Info is not present. If the cgi-Info is present, this parameter may be sent. If the above conditions for sending this parameter are met but the value of E-UTRA ARFCN is greater than 65535, this parameter SHALL be set to 65535. EARFCN, range: (0 . . . 65535) |
| >>EARFCN-EXT | CV | If the parameter EARFCN (immediately above) is sent and the value of E-UTRA ARFCN exceeds 65535, then this parameter SHALL be sent and set to the value of E-UTRA ARFCN. EARFCN-EXT, range: (65536 . . . 262143) |

The LID parameter defined as shown in Tables 1 and 2 supports location of a UE 105 with LTE wireless access and with wireless access according to certain other technologies such as WCDMA, GSM, WLAN (IEEE 802.11) and HRPD but does not support location of a UE 105 with 5G NR wireless access such as in communication system 100. A later version of SUPL may support location of a UE 105 with 5G NR wireless access—e.g. by extending the LID parameter shown in Tables 1 and 2 with additional information applicable to a 5G NR serving cell for a UE 105. However, implementation of such a later version of SUPL may add complexity to a UE 105 and H-SLP 149 and may not occur for some interim period of a few years or more. In addition, a UE 105 that is not implemented according to this later version of SUPL may still support wireless communication using 5G NR and may need to be located when accessing 5G NR—e.g. as in communication system 100. It may therefore be desirable to support SUPL location for 5G NR wireless access using a simpler method than that standardized by OMA in a later version of SUPL. Embodiments of such a simplified method are described herein and involve using LTE Cell Information as shown in Table 2 to convey information related to 5G NR wireless access. These embodiments may not require any formal change to a LID parameter (e.g. as shown in Table 1) or to the LTE Cell Information defined for SUPL and shown in Table 2 and may be forward compatible with any later changes to the LID parameter and LTE cell Information defined by OMA.

As one example, referred to here as example E1, of the method, a UE 105 may be accessing 5G NR as in communication system 100. In this case, a SUPL session may be established between the UE 105 and H-SLP 149 using the data connection 160 with the purpose of obtaining a location estimate for the UE 105. During the SUPL session, the UE 105 may transfer a LID parameter to H-SLP 149—e.g. by sending a SUPL POS INIT message containing the LID parameter to the H-SLP 149. The H-SLP may use the LID parameter to obtain or help obtain a location estimate for the UE 105. The LID parameter may contain "5G information" related to the 5G NR wireless access for UE 105 including information which may be related to the 5G NR serving cell for the UE 105. The 5G information may be included in the LTE Cell Information data field of the LID parameter, which may be encoded the same as or similarly to that shown in Table 2. The 5G information may comprise information for a 5G NR serving cell for UE 105 or information for an LTE neighbor cell for UE 105. The LTE neighbor cell may have a coverage area that includes the location of UE 105 and overlaps with the coverage area of the NR serving cell for UE 105 and may thus enable an approximate location estimate for the UE 105. The information for the LTE neighbor cell may include a cell global identification for the LTE neighbor cell. The information for the 5G NR serving cell for the UE 105 may include an indication in the LTE Cell Information data field (e.g. a flag or reserved bit value in one of the data fields for the LTE Cell Info shown in Table 2) indicating the presence of the information for the 5G NR serving cell for the UE 105. The information for the 5G NR serving cell for the UE 105 may comprise a 5G NR Physical Cell ID (PCI), a 5G NR cell global ID (CGI), a 5G NR Tracking Area code (TAC) or some combination of these. The information for the 5G NR serving cell may be encoded using one or more data fields in the LTE Cell Information data field. At least some of the information for the 5G NR serving cell may be truncated. For example, since an LTE Cell ID comprises 28 bits whereas a 5G NR Cell ID comprises 36 bits, a 5G NR serving cell identity (ID) might be truncated to 28 bits by removing the high order 8 bits or low order 8 bits. Such a truncated cell ID may still be useful for locating a UE 105 by an H-SLP 149—e.g. if a network does not use the 8 high order bits of an NR cell ID or arranges for NR cells sharing the same 8 low order bits to be in the same local area. The indication of the presence of the information for the 5G NR serving cell for the UE 105 may comprise a reserved value or a reserved bit sequence for a data field in the LTE Cell Information data field (e.g. such as the TA data field in Table 2). In some embodiments, both the UE 105 and H-SLP 149 support the method and are each aware of this support by the other entity. The knowledge of the support by the other entity may be configured in the UE 105 and H-SLP 149 by the operator of HPLMN 140 and may be applicable to location of all subscribed UEs 105 by H-SLP 149. In a variant of Example E1, the information related to a 5G NR serving cell for a UE 105 may be encoded in one or more other fields of a LID parameter, such as a cell information field for WCDMA or information for a WLAN access point.

Further embodiments are described in detail below in relation to FIGS. 2 and 3. Furthermore, although embodiments described herein are directed toward the use of an H-SLP 149, the techniques disclosed herein may be used with other types of SLP servers (e.g., a Visited SLP (V-SLP), D-SLP and/or E-SLP) and/or other location server types.

Figure 2:
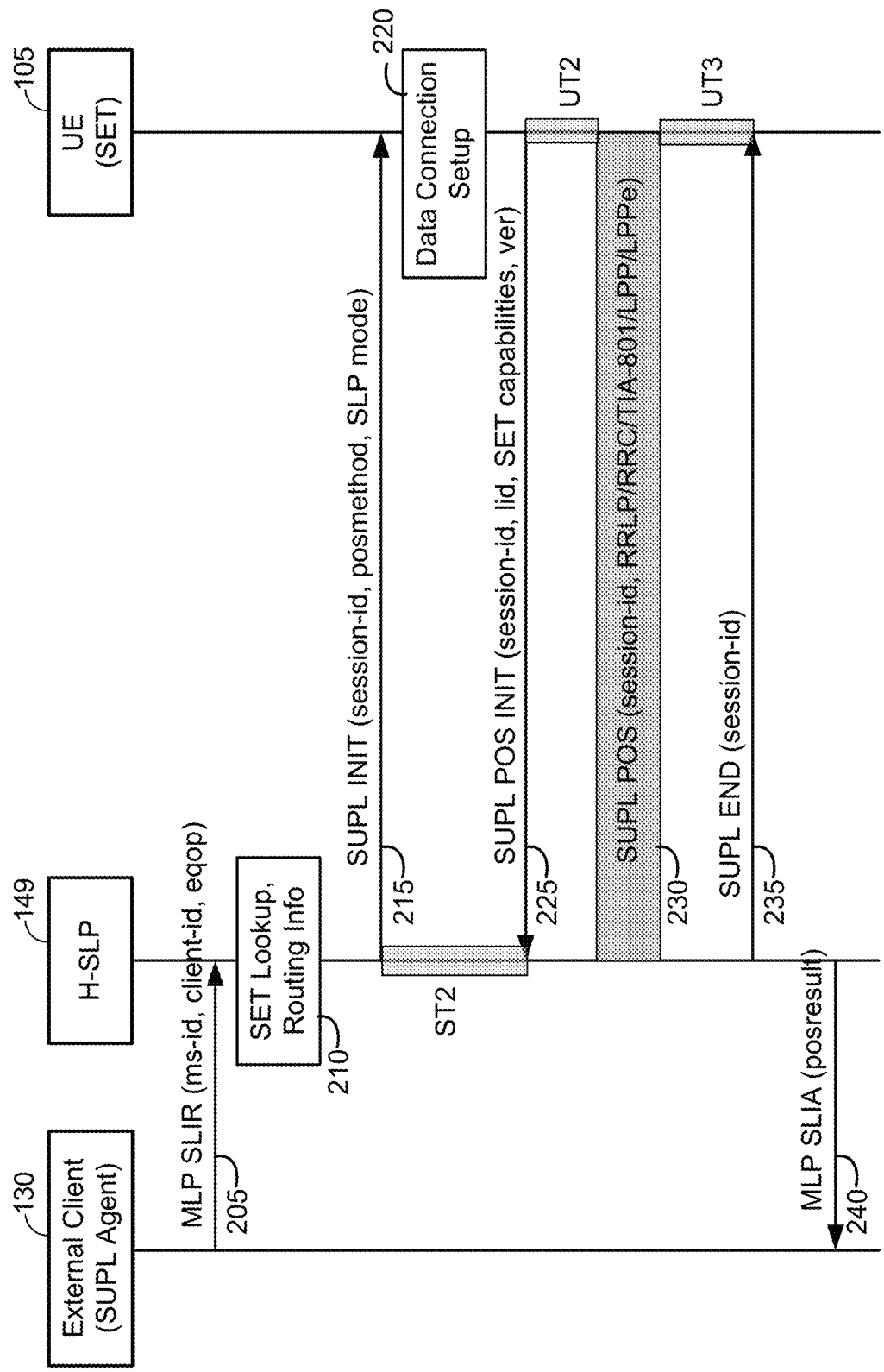
FIG. 2 is a message-flow diagram illustrating how a network-initiated Secure User Plane Location (SUPL) session may be conducted, according to an embodiment.

FIG. 2 is a message-flow diagram illustrating an example of how a network-initiated SUPL session between an H-SLP 149 and a UE 105 may be conducted. Here, an external client 130 acting as a SUPL agent may begin the messaging illustrated in FIG. 2 by sending, at action 205, a Mobile Location Protocol (MLP) Standard Location Immediate Request (SLIR) message to the H-SLP 149, with which external client 130 is associated. The MLP SLIR message may request a location of UE 105. The H-SLP 149 may then authenticate the external client 130 and check if the external client 130 is authorized for the service it requests, based on a client-id received. Further, based on a received ms-id parameter identifying UE 105, the H-SLP 149 may apply subscriber privacy for UE 105 against the client-id.

If notification and verification or notification only is required, the H-SLP 149 may perform functionality at block 210, in which the H-SLP 149 may verify that the UE 105 is currently not SUPL roaming, and may further verify that the UE 105 supports SUPL.

At action 215, H-SLP 149 initiates a SUPL session with the UE 105 by sending a SUPL INIT message to the UE 105—e.g. using the User Datagram Protocol (USP) and the Internet Protocol (IP) or using SMS. As partly indicated in FIG. 2, the SUPL INIT message may comprise a session-id, proxy/non-proxy mode indicator and an intended positioning method. If the result of the privacy check made by the H-SLP 149 after receiving the MLP SLIR message at action 205 indicates that notification or verification to the target subscriber for UE 105 is needed, the H-SLP 149 may also include a Notification element in the SUPL INIT message. Before the SUPL INIT message is sent, the H-SLP 149 may also compute and store a hash of the message.

At block 220, the UE 105 may analyze the received SUPL INIT. If found to be non-authentic the UE 105 may then take no further action. Otherwise the UE 105 can take needed action preparing for establishment or resumption of a secure connection.

The UE 105 may also evaluate Notification rules and may follow appropriate actions. The UE 105 also checks the proxy/non-proxy mode indicator to determine if the H-SLP 149 uses proxy or non-proxy mode. In the embodiment illustrated in FIG. 2, proxy mode is used and the UE 105 may establish a secure connection as part of block 220, such as the data connection 160 in FIG. 1, to the H-SLP 149 using the H-SLP 149 address that has been provisioned by the Home Network in the UE 105. Establishment of a secure connection as part of block 220 may include: (i) establishing a TCP/IP connection from UE 105 to H-SLP 149; (ii) establishing a Transport Layer Security (TLS) session between UE 105 and H-SLP 149; (iii) authenticating security credentials for UE 105 by H-SLP 149; (iv) authenticating security credentials for H-SLP 149 by UE 105; and/or (v) establishing two-way ciphering of data (e.g. SUPL messages) that are transferred between UE 105 and H-SLP 159 using the established TCP/IP connection and TLS session. Establishment of a secure connection as part of block 220 may involve active support by both UE 105 and H-SLP 149, though may be initiated only by UE 105.

The UE 105 then sends a SUPL POS INIT message to the H-SLP 149 using the secure connection, at action 225, to continue the SUPL location session with the H-SLP 149. The UE 105 can send the SUPL POS INIT message even if the UE 105 supports positioning technologies that do not include the intended positioning method indicated in the SUPL INIT message. The SUPL POS INIT message may comprise the session-id, SET capabilities, a hash of the received SUPL INIT message (ver) and a Location ID corresponding to the LID (or lid) described herein in Tables 1 and 2. The UE 105's SET capabilities may include the positioning methods supported by UE 105 (e.g., Assisted GPS (A-GPS), such as SET-Assisted A-GPS, SET-Based A-GPS) and associated positioning protocols (e.g., Radio Resource Location Services (LCS) Protocol (RRLP), Radio Resource Control (RRC), TIA-801 or LPP/LPP Extensions (LPPe)). The UE 105 may additionally provide a Network Measurement Report (NMR) specific for the radio technology being used (e.g., for GSM: Timing Advance (TA), received signal levels (RXLEV)). The UE 105 may additionally or alternatively provide its position, if this is supported. The UE 105 may include and set a Requested Assistance Data element in the SUPL POS INIT.

According to embodiments, to help ensure the UE 105 provides usable cell related information in the LID parameter of the SUPL POS INIT message sent at action 225, in the case that UE 105 is using 5G NR wireless access, the UE 105 can take one of the following steps.

A. For step A, the UE 105 may include the cell ID of an LTE cell in the LID parameter. This may be the cell ID of an LTE cell (e.g., an eNB) on which the UE 105 is camped, or may be the cell ID of a LTE neighbor cell detected from a brief scan by UE 105 at some recent previous time (e.g. within the last 30 seconds to 5 minutes).

B. For step B, the UE 105 may provide, in the LID parameter, a previous LTE cell ID for a previous serving cell or a previous neighbor cell with a status flag to identify this as a previous LTE cell. A UE 105 can, for example, cache information regarding the most recent LTE cell ID with which it has been served. It can then simply provide the cached cell ID (last known cell ID information) and include a status code indicating a cached cell ID.

C. For step C, the UE 105 may use a special 28-bit LTE cell ID to at least partially identify a 5G NR serving cell in the LID parameter. Here, unused 28-bit cell IDs for LTE may be utilized to identify 5G NR serving cells. For example, for a period of time (e.g., during the course of transitioning from LTE to 5G NR wireless support by VPLMN 150) there may be a sufficient number of unused 28-bit LTE cell IDs of a given communication system (e.g., communication system 100 of FIG. 1) to be assigned to 5G NR cells. (This may occur, for example at the beginning of a transitional period when there are relatively few 5G NR cells. This period of time further may be lengthened if, during the transitional period, LTE cells are being decommissioned, enabling their respective 28-bit cell IDs to be used to identify 5G NR cells.) In this case, both the UE 105 and H-SLP 149 may have a lookup table (or similar data structure) that maps the unused 28-bit LTE cell IDs to and from corresponding 5G NR 36-bit cell IDs.

D. For step D, the UE 105 may encode a 36-bit 5G NR cell ID in a LID parameter using data fields (also called Information Elements (IEs) or parameters) available for LTE. Similar to step C above, UE 105 and H-SLP 149 may be specially programmed to coordinate this functionality. However, rather than utilizing a lookup table, all 36 bits of the 5G NR cell ID may be included in the LTE Cell Info data field.

As one example of step D, the 36 bits of the 5G NR cell ID may be split into two separate data fields. For example, 28 of the 36 bits (e.g. low order or high order 28 bits) could be included in the LTE Cell ID portion of the LTE Cell Information data field (where a normal LTE cell ID typically would be inserted). The remaining 8 bits of the 36-bit 5G NR cell ID could be included in one or more other data fields, such as the Tracking Area Code (TAC) data field or Physical Cell ID (PCI) data field.

In another example of step D, 28 bits of a 36-bit 5G NR cell ID may be included in the LTE Cell Information data field. In some embodiments, the LTE cell information data field may include the higher or lower 28 bits, depending on the operator. In some cases, the lower 28 bits may be enough to uniquely identify a 5G NR serving cell. In some cases the upper 28 bits may identify a region (if, for example, an operator relates its cell IDs to geographic proximity). In a further example, the remaining 8 bits of the 36-bit NR cell ID may be included elsewhere in the LID parameter (e.g. in a TAC or PCI field as just described).

In another example of step D, one or more additional bits can be used within one or more other data fields in the LTE Cell Info data field (or in the LID parameter) as a flag to indicate to the H-SLP 149 that the LID parameter has been encoded with 5G NR cell related information such as a serving NR cell ID. This flag may comprise, for example, a reserved value that is not normally used in a data field. For example, the flag may be included as a reserved value in the TAC data field which is then not used to convey a normal TAC or may use otherwise unused bits in a TAC field which can be used to include the flag. Other embodiments may reserve a particular value in a PCI data field.

In some embodiments, the UE 105 may decide on taking one of the Steps A-D above based on a predetermined priority. In some embodiments, for example, the UE 105 may prioritize Steps A-D in the order they are listed above (Step A having the highest priority). Other embodiments may have a different order of priority (prioritizing, for example, Step D over Step C.) The UE 105 may then perform a lower-priority step if unable to perform a higher-priority step, in order to ultimately provide usable NR cell information in the LID parameter of the SUPL POS INIT message sent at action 225.

If a position retrieved from or calculated based on information received in the SUPL POS INIT message is available that meets a required Quality of Positioning (QoP), the H-SLP 149 may skip to action 235, sending an SUPL END message and not engaging in a SUPL POS session.

At block 230, the H-SLP 149 may check that the hash of the SUPL INIT received at action 225 matches the one it has computed for this particular SUPL session. Based on the SUPL POS INIT message including positioning method(s) (or "posmethod(s)") supported by the UE 105, the H-SLP 149 may then determine the posmethod. If required for the posmethod, the H-SLP 149 may use a supported positioning protocol (e.g., RRLP, RRC, TIA-801 or LPP/LPPe) from the SUPL POS INIT message sent at action 225.

Additionally, at block 230, the UE 105 and the H-SLP 149 may exchange several successive positioning messages, each comprising a SUPL POS message which includes one or more positioning protocol messages (e.g. for LPP or RRLP). The H-SLP 149 may then calculate a position estimate for the UE 105 based on the received positioning measurements (UE-Assisted) from the UE 105 or the UE 105 may calculate the position estimate based on positioning measurements obtained by the UE 105 and on assistance data received from the H-SLP 149 (UE-Based).

Once the position calculation is complete the H-SLP 149 may send a SUPL END message to the UE 105 at action 235, informing the UE 105 that no further positioning procedure will be started and that the SUPL location session is finished. The UE 105 may then release the secure connection to the H-SLP 149 (e.g. data connection 160) and release all resources related to this session.

The H-SLP 149 may send the position estimate back to the external client 130 in an MLP Standard Location Immediate Answer (SLIA) message at action 240, and the H-SLP 149 may release all resources related to this SUPL session.

Figure 3:
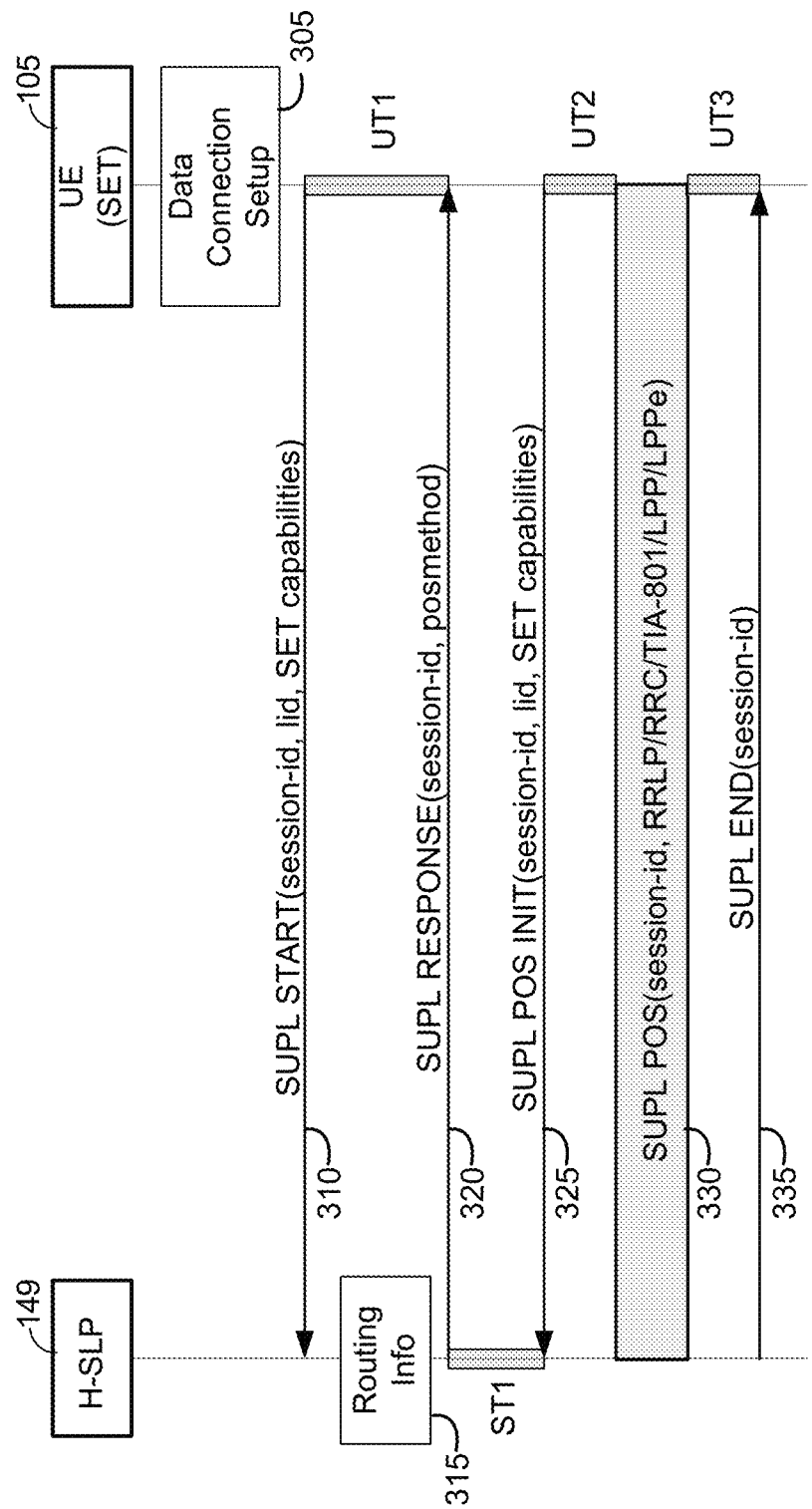
FIG. 3 is a message-flow diagram illustrating how a User Equipment (UE)-initiated SUPL session may be conducted, according to an embodiment.

FIG. 3 is a message-flow diagram illustrating an example of how a UE-initiated (SET-initiated) SUPL session between an H-SLP 149 and a UE 105 may be conducted, according to an embodiment. The utilization of a LID in the SUPL session can be similar to the utilization of the LID described above with regard to FIG. 2.

At block 305, the UE 105 may (e.g. via a SUPL Agent on the UE 105) receive a request for a location of UE 105 from an application running on the UE 105. The UE 105 can then take appropriate action to establish or resume a secure data connection to the H-SLP 149 which may correspond to the data connection 160 in FIG. 1. Establishment of a secure data connection to the H-SLP 149 at block 305 may be as described for block 220 for FIG. 2.

The SUPL Agent on the UE 105 may use a default address of H-SLP 149 provisioned by the Home Network of UE 105 to establish or resume a secure connection to the H-SLP 149 at block 305 and may then send a SUPL START message to the H-SLP 149 at action 310 to start a SUPL session with the H-SLP 149. The SUPL START message may contain a session-id, SET capabilities of UE 105 and a LID parameter. Similar to the embodiment illustrated in FIG. 2, the UE 105 may take any of a variety of steps (e.g., Steps A-D previously described) to include information related to a 5G NR serving cell or a nearby (e.g. neighbor) LTE cell for the UE 105 in the LID parameter of the SUPL START message sent at action 310 when UE 105 is accessing 5G NR.

If the H-SLP 149 is able to determine a location for the UE 105 using the LID received for action 310, where the location meets QoP requirements, the H-SLP 149 may directly proceed to action 335, in which a SUPL END message including a location estimate for UE 105 may be sent to the UE 105.

At block 315, H-SLP 149 may verify that the UE 105 is currently not SUPL roaming.

Consistent with the SUPL START message sent at action 310, including posmethod(s) supported by the UE 105, the H-SLP 149 may determine a preferred posmethod. If required for the posmethod, the H-SLP 149 may use a positioning protocol supported by UE 105 (e.g., RRLP, RRC, TIA-801 or LPP/LPPe) as indicated in the SUPL START message. The H-SLP 149 may respond by sending a SUPL RESPONSE message at action 320 to the UE 105. The SUPL RESPONSE may contain the session-id but no H-SLP address, to indicate to the UE 105 that a new connection should not be established. The SUPL RESPONSE may also contain the posmethod, and may also contain location information, not meeting the QoP, but giving a coarse approximation of the position, based on information received in the SUPL START message at action 310.

After the UE 105 receives the SUPL RESPONSE from the H-SLP 149, the UE 105 may send a SUPL POS INIT message to H-SLP 149 at action 325. The SUPL POS INIT message may contain at least the session-id, SET capabilities and a LID parameter. Again, the LID parameter may include information related to a 5G NR serving cell in the manner described herein, and may comprise the same information (e.g. the same LID parameter) as was included in the SUPL START message sent at action 310. The UE 105 may provide its position, if this is supported, and/or may include a first SUPL POS message within the SUPL POS INIT message, and/or may set the Requested Assistance Data element in the SUPL POS INIT sent at action 325. If a position retrieved or calculated based on information (e.g. the LID) received in the SUPL POS INIT message is available which meets a required QoP, the H-SLP 149 may directly proceed to action 335, in which the H-SLP 149 sends a SUPL END message and does not engage in a SUPL POS session.

Similar to block 230 of FIG. 2, at block 330 of FIG. 3 the UE 105 and the H-SLP 149 may exchange several successive positioning (e.g. SUPL POS) messages. The H-SLP 149 may calculate a position estimate for UE 105 based on the received positioning measurements (UE-Assisted) or the UE may calculate the position estimate based on assistance data obtained from the H-SLP 149 and measurements obtained by the UE 105 (UE-Based).

Once the position calculation is complete the H-SLP 149 can send a SUPL END message at action 335 to the UE 105 informing UE 105 that no further positioning procedure will be started and that the SUPL location session is finished. Depending on positioning method and used positioning protocol, the H-SLP 149 may add the determined position estimate to the SUPL END message. The UE 105 may then release the secure connection (e.g. the data connection 160) and may release all resources related to this SUPL session, and the H-SLP 149 may release all resources related to this SUPL session.

Figure 4:
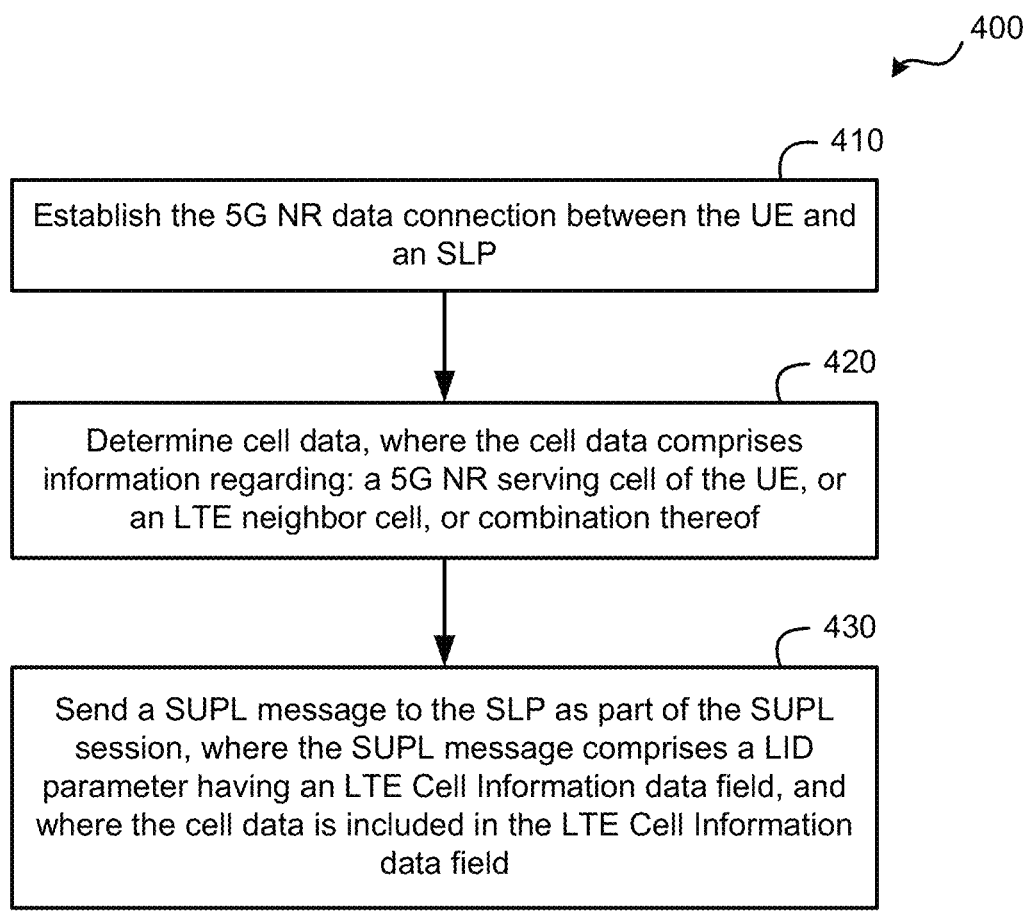
FIG. 4 is a flow diagram of a method of supporting location of a UE at the UE using a SUPL session over a 5G New Radio (NR) data connection, according to an embodiment.

FIG. 4 is a flow diagram of a method 400 of supporting location of a UE using a SUPL session over a 5G NR data connection, according to an embodiment. The method 400 may be performed by the UE (e.g. the UE 105). As with other figures provided herein, FIG. 4 is provided as a non-limiting example. Alternative embodiments may vary in function by combining, separating, or otherwise varying the functionality described in the blocks illustrated in FIG. 4. Means for performing the functionality of one or more of the blocks illustrated in FIG. 4 may comprise hardware and/or software components of a UE, such as the UE 105 illustrated in FIG. 6 and described in more detail below. Additionally, it can be noted that the functions illustrated in FIG. 4 may be performed by a UE for both network-initiated and UE-initiated SUPL sessions.

Figure 6:
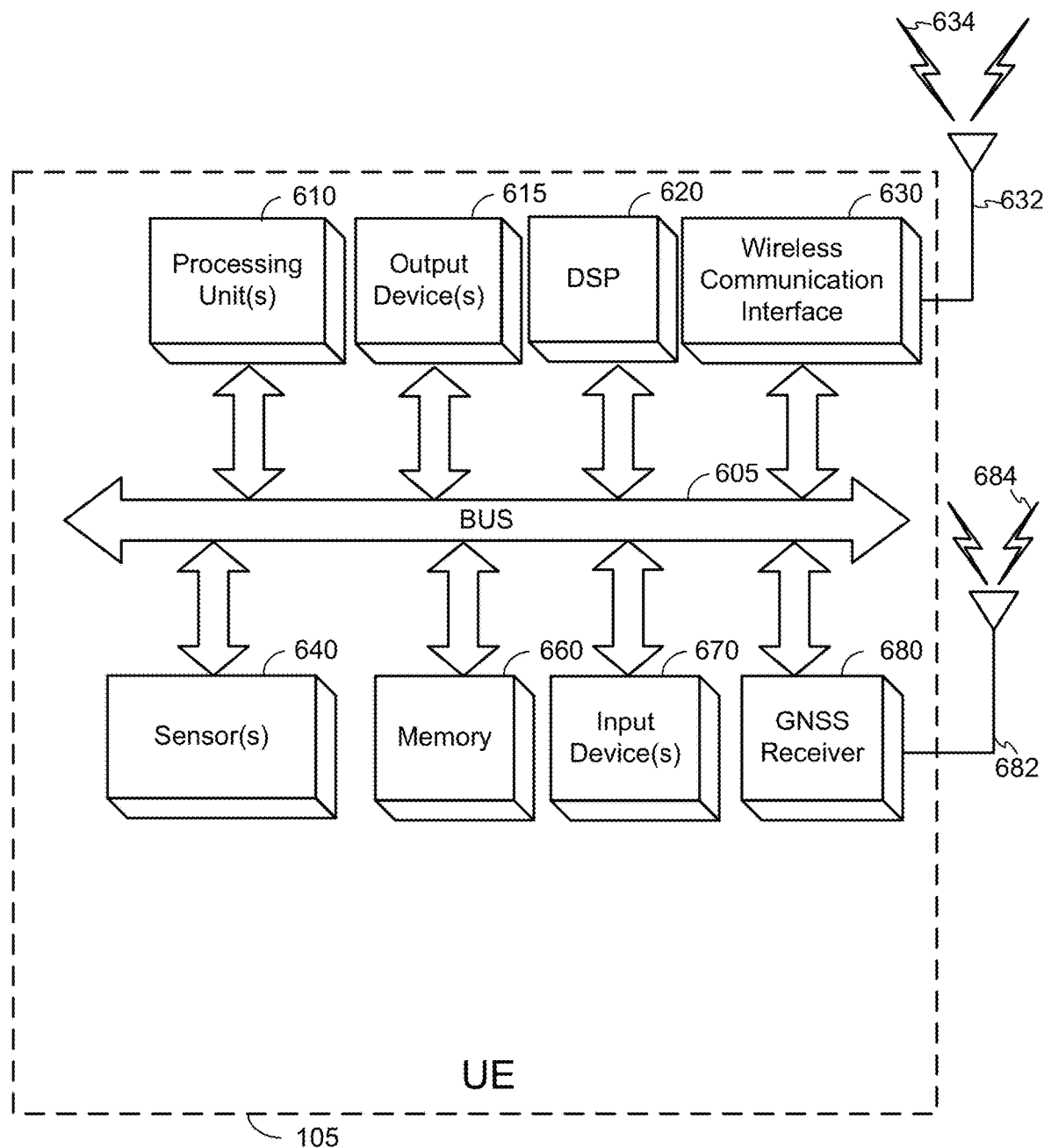
FIG. 6 is a block diagram of an embodiment of a UE.

At block 410, a 5G NR data connection (e.g. the data connection 160 in FIG. 1) is established between the UE and an SLP (e.g. the H-SLP 149). As indicated in FIG. 1, a communication system may include several intervening devices through which communications between the UE and SLP (e.g., H-SLP 149) may be relayed, including a base station supporting a 5G NR serving cell (e.g., a serving gNB 110). Means for performing the functionality at block 410 may include one or more software and/or hardware compo-nents of a UE, such as a bus 605, processing unit(s) 610, memory 660, wireless communication interface 630, and/or other software and/or hardware components of a UE 105 as illustrated in FIG. 6 and described in more detail below. Block 410 may correspond to block 220 in FIG. 2 or block 305 in FIG. 3.

At block 420, the functionality comprises determining cell data, where the cell data comprises information regarding: a 5G NR serving cell of the UE, or an LTE neighbor cell for the UE, or a combination thereof. As discussed in embodiments herein, a UE may determine information related to a 5G NR serving cell or LTE neighbor cell for the UE to include in an LID parameter by following any of Steps A-D described above or as described for example E1, which include determining information regarding a 5G NR serving cell or an LTE neighbor cell. Means for performing the functionality at block 420 may include one or more software and/or hardware components of a UE, such as, bus 605, processing unit(s) 610, memory 660, and/or other software and/or hardware components of a UE 105 as illustrated in FIG. 6 and described in more detail below.

At block 430, the functionality comprises sending a SUPL message to the SLP as part of the SUPL session, where the SUPL message comprises a LID parameter having an LTE Cell Information data field. The cell data is included in the LTE Cell Information data field (e.g. as described for steps A-D and example E1 above). According to some embodiments, the location of the UE can then be obtained at least in part by the SLP using the cell data. Means for performing the functionality at block 430 may include one or more software and/or hardware components of a UE, such as, bus 605, processing unit(s) 610, memory 660, wireless communication interface 630, and/or other software and/or hardware components of a UE 105 as illustrated in FIG. 6 and described in more detail below. Block 430 may correspond to action 225 for FIG. 2 or either of actions 310 and 325 for FIG. 3.

As indicated in the previously-described embodiments, the method 400 may include any of a variety of additional features, depending on desired functionality. In some embodiments, for example, the cell data comprises the information regarding the LTE neighbor cell, and the information regarding the LTE neighbor cell includes a cell global identification of the LTE neighbor cell. In some embodiments, the cell data comprises the information regarding the 5G NR serving cell of the UE, and the method further comprises including an indication in the LTE Cell Information data field indicating a presence of the information regarding the 5G NR serving cell of the UE. As previously indicated, the indication of the presence of the information regarding the 5G NR serving cell of the UE may comprise a flag, which may comprise a reserved value or a reserved bit sequence for a data field in the LTE Cell Information data field.

The information regarding the 5G NR serving cell of the UE may also vary, depending on desired functionality. In some embodiments, this information may comprise a 5G NR Physical Cell ID, 5G NR cell global ID, or a 5G NR Tracking Area code, or any combination thereof. This information may be encoded using one or more data fields in the LTE Cell Information data field and/or in some other field(s) in the LID parameter, as discussed in the embodiments above. The data fields may include, for example, the LTE Cell ID, as well as the TAC and/or PCI data fields. At least some of the information regarding the 5G NR serving cell of the UE may additionally or alternatively be truncated.

The SUPL message sent by the UE may also vary, depending on the scenario. In instances in which the UE initiates the SUPL session, for example, the SUPL message may comprise a SUPL START or SUPL POS INIT message. In instances in which the SLP initiates the SUPL session, the SUPL message may comprise a SUPL POS INIT message. In this latter case, the UE may receive a SUPL INIT message from the SLP, and establishing the 5G NR data connection between the UE and the SLP may be in response to receiving the SUPL INIT message.

Figure 5:
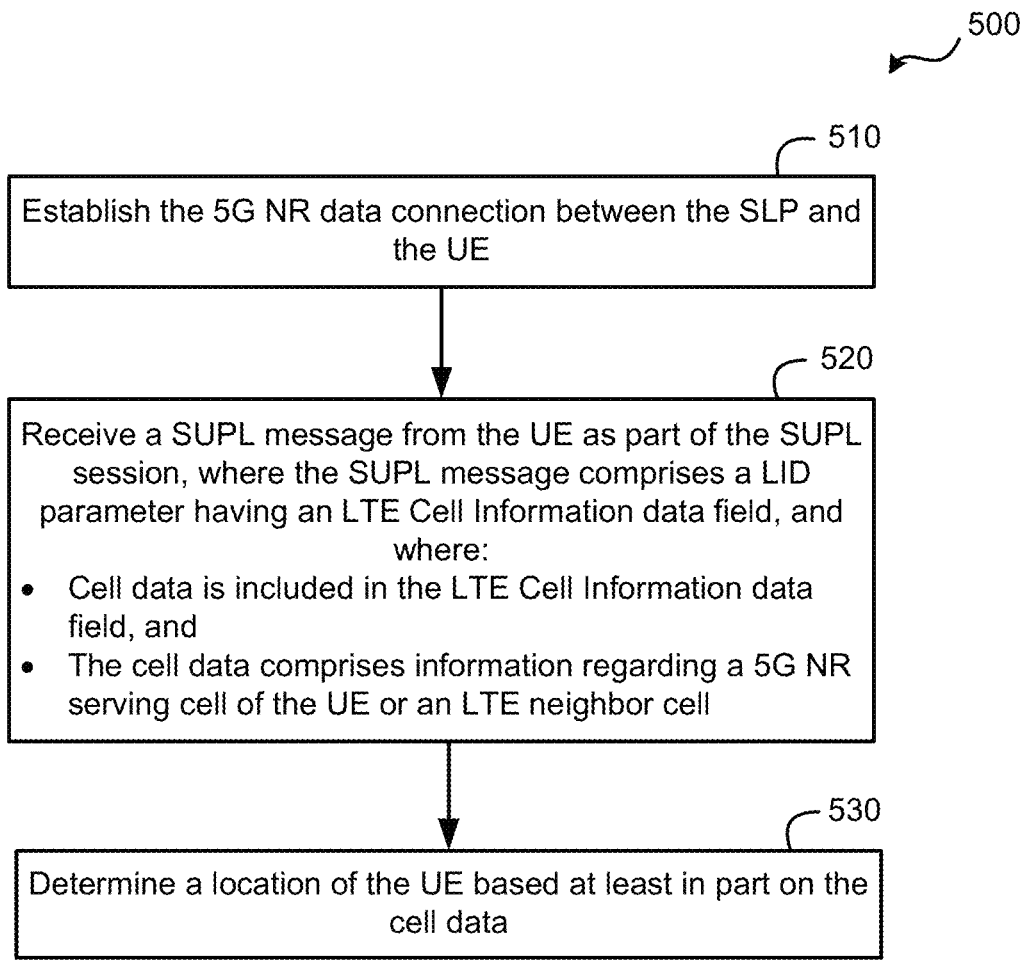
FIG. 5 is a flow diagram of a method at a SUPL Location Platform (SLP) of supporting location of a UE using a SUPL session over a 5G NR data connection, according to an embodiment.

FIG. 5 is a flow diagram of a method 500 at an SLP (e.g. the H-SLP 149) of supporting location of a UE (e.g. the UE 105) using a SUPL session over a 5G NR data connection, according to an embodiment. Alternative embodiments may vary in function by combining, separating, or otherwise varying the functionality described in the blocks illustrated in FIG. 5. Means for performing the functionality of one or more of the blocks illustrated in FIG. 5 may comprise hardware and/or software components of a computer system, such as the computer system 700 illustrated in FIG. 7 and described in more detail below. Additionally, it can be noted that the functions illustrated in FIG. 5 may be performed by an SLP for both network-initiated and UE-initiated SUPL sessions. According to some embodiments, the SLP may comprise an H-SLP, as illustrated in embodiments described above.

Figure 7:
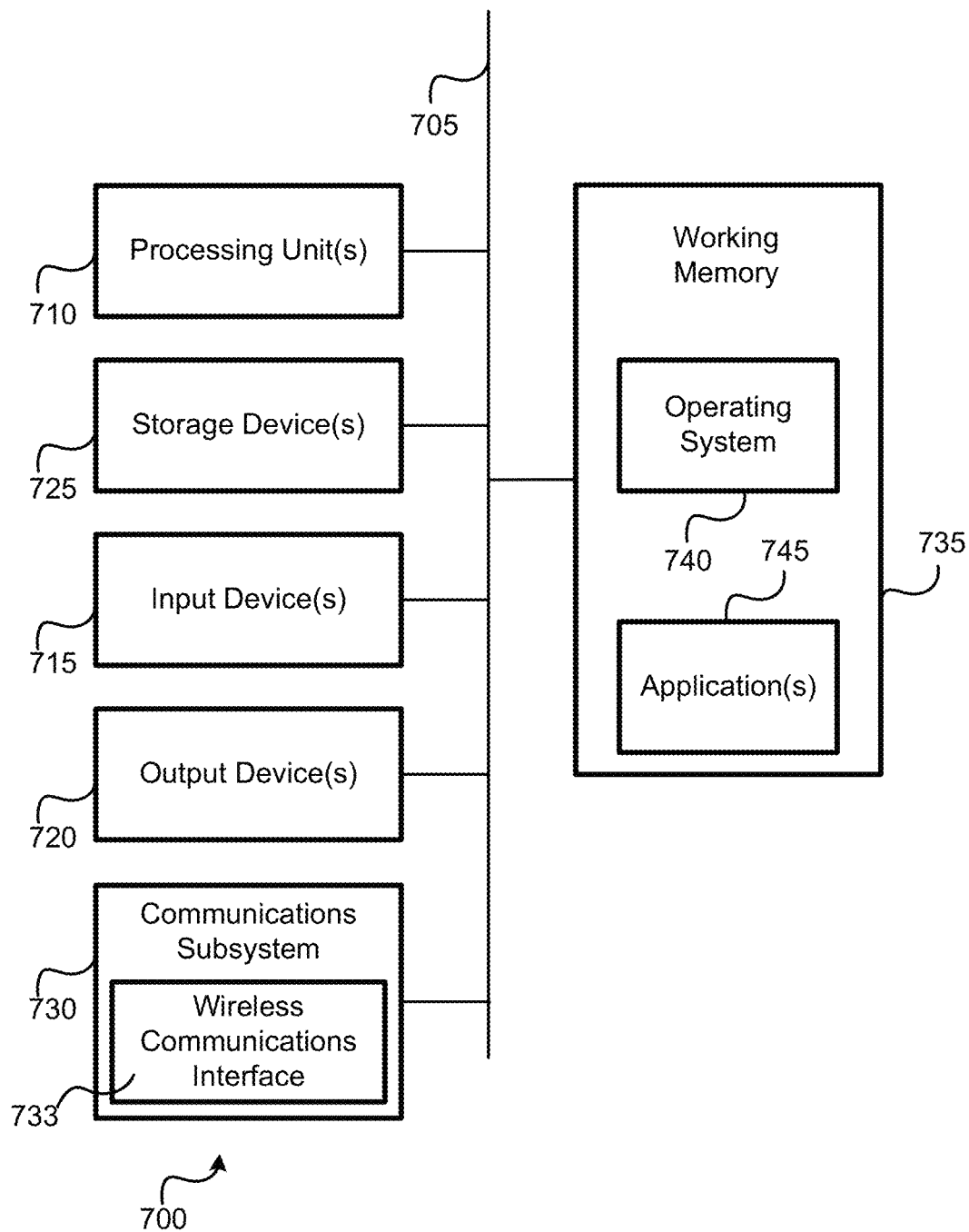
FIG. 7 is a block diagram of an embodiment of a computer system.

At block 510, a 5G NR data connection (e.g., the data connection 160 in FIG. 1) is established between the SLP and the UE. Again, a communication system may include several intervening devices through which communications between the UE and SLP may be relayed. Means for performing the functionality at block 510 may include one or more software and/or hardware components of a computer system, such as a bus 705, processing unit(s) 710, memory 735, communication subsystem 730, and/or other software and/or hardware components of a computer system 700 as illustrated in FIG. 7 and described in more detail below. Block 510 may correspond to block 220 in FIG. 2 or block 305 in FIG. 3.

At block 520, the functionality comprises receiving a SUPL message from the UE as part of the SUPL session. For example, the SUPL message may start the SUPL session or may continue the SUPL session. The SUPL message comprises a LID parameter having an LTE Cell Information data field. Cell data is included in the LTE Cell Information data field, and the cell data comprises information regarding a 5G NR serving cell of the UE or an LTE neighbor cell. Means for performing the functionality at block 520 may include one or more software and/or hardware components of a computer system, such as a bus 705, processing unit(s) 710, memory 735, communication subsystem 730, and/or other software and/or hardware components of a computer system 700 as illustrated in FIG. 7 and described in more detail below. Block 520 may correspond to action 225 for FIG. 2 or either of actions 310 and 325 for FIG. 3.

At block 530, a location of the UE is determined based at least in part on the cell data. Means for performing the functionality at block 520 may include one or more software and/or hardware components of a computer system, such as a bus 705, processing unit(s) 710, memory 735, communication subsystem 730, and/or other software and/or hardware components of a computer system 700 as illustrated in FIG. 7 and described in more detail below.

As indicated in the previously-described embodiments, the method 500 may include any of a variety of additional features, depending on desired functionality. For example, in some embodiments where the cell data comprises information regarding the LTE neighbor cell, the information regarding the LTE neighbor cell may include a cell global identification of the LTE neighbor cell. In some embodiments where the cell data comprises the information regarding the 5G NR serving cell of the UE, the method may further comprise identifying an indication in the LTE Cell Information data field indicating the presence of the information regarding the 5G NR serving cell of the UE. As previously indicated, the indication of the presence of the information regarding the 5G NR serving cell of the UE may comprise a flag, which may comprise a reserved value or a reserved bit sequence for a data field in the LTE Cell Information data field.

The information regarding the 5G NR serving cell of the UE may also vary, depending on desired functionality. In some embodiments, this information may comprise a 5G NR Physical Cell ID, 5G NR cell global ID, or a 5G NR Tracking Area code, or any combination thereof. This information may be encoded using one or more data fields in the LTE Cell Information data field and/or in some other field(s) in the LID parameter, as discussed in the embodiments above. The data fields may include, for example, the LTE Cell ID, as well as the TAC and/or PCI data fields. The information regarding the 5G NR serving cell may additionally or alternatively be truncated.

The SUPL message sent by the UE may also vary, depending on the scenario. In instances in which the UE initiates the SUPL session, for example, the SUPL message may comprise a SUPL START or SUPL POS INIT message. In instances in which the SLP initiates the SUPL session, the SUPL message may comprise a SUPL POS INIT message. In this latter case, the SLP may send a SUPL INIT message to the UE, and establishing the 5G NR data connection between the SLP and the UE may be in response to the UE receiving the SUPL INIT message.

According to embodiments, SLPs may vary in design and function, depending on desired functionality. For example, an embodiment of an SLP, according to this description, comprises a communication interface, a memory, and one or more processing units communicatively coupled with the communication interface and the memory. The one or more processing units are configured to establish, using the communication interface, a 5G NR data connection between the SLP and a UE, and receive, using the communication interface, a SUPL message from the UE as part of a SUPL session, the SUPL message comprising a LID parameter having a LTE Cell Information data field. Cell data is included in the LTE Cell Information data field, and the cell data comprises information regarding a 5G NR serving cell of the UE, or an LTE neighbor cell, or a combination thereof. The one or more processing units are also configured to determine a location of the UE based at least in part on the cell data.

Alternative embodiments of the example SLP may include one or more of the following features. The one or more processing units may be further configured to identify an indication in the LTE Cell Information data field indicating the presence of the information regarding the 5G NR serving cell of the UE. The one or more processing units may be further configured to receive, using the communication interface, a SUPL START message at the SLP after establishing the 5G NR data connection between the SLP and the UE. The one or more processing units may be further configured to send, using the communication interface a SUPL INIT message to the UE, wherein the one or more processing units are further configured to establish the 5G NR data connection between the UE and the SLP is in response to the UE receiving the SUPL INIT message.

An example method at an SLP of supporting location of a UE using a SUPL session over a 5G NR data connection, according to this description, comprises establishing the 5G NR data connection between the SLP and the UE, and receiving a SUPL message from the UE as part of the SUPL session, the SUPL message comprising a Location ID (LID) parameter having a Long-Term Evolution (LTE) Cell Information data field. The cell data is included in the LTE Cell Information data field, and the cell data comprises information regarding a 5G NR serving cell of the UE, or an LTE neighbor cell, or a combination thereof. The method further comprises determining a location of the UE based at least in part on the cell data.

Alternative embodiments of the example method may include one or more of the following features. The cell data may comprise the information regarding the LTE neighbor cell, and the information regarding the LTE neighbor cell may include a cell global identification of the LTE neighbor cell. The cell data may comprise the information regarding the 5G NR serving cell of the UE, and the method may further comprise identifying an indication in the LTE Cell Information data field indicating the presence of the information regarding the 5G NR serving cell of the UE. The information regarding the 5G NR serving cell of the UE may comprise a 5G NR Physical Cell ID, a 5G NR cell global ID, or a 5G NR Tracking Area code, or any combination. The information regarding the 5G NR serving cell of the UE may be encoded using one or more data fields in the LTE Cell Information data field. At least some of the information regarding the 5G NR serving cell of the UE may be truncated. The indication of the presence of the information regarding the 5G NR serving cell of the UE may comprise a reserved value or a reserved bit sequence for a data field in the LTE Cell Information data field. The UE may initiate the SUPL session, and the method may further comprise receiving a SUPL START message at the SLP after establishing the 5G NR data connection between the SLP and the UE. The SLP may initiate the SUPL session, and the method may further comprise sending a SUPL INIT message to the UE, wherein establishing the 5G NR data connection between the UE and the SLP is in response to the UE receiving the SUPL INIT message. The SUPL message may comprise a SUPL POS INIT message.

According to another embodiment, an example computer server comprises means for establishing a 5G NR data connection between the computer server and a UE, and means for receiving a SUPL message from the UE as part of a SUPL session, the SUPL message comprising a LID parameter having an LTE Cell Information data field. Cell data is included in the LTE Cell Information data field, and the cell data comprises information regarding a 5G NR serving cell of the UE or an LTE neighbor cell. The computer server further comprises means for determining a location of the UE based at least in part on the cell data.

Alternative embodiments of the computer server may comprise one or more the following features. The computer server may further comprise means for identifying an indication in the LTE Cell Information data field indicating the presence of the information regarding the 5G NR serving cell of the UE. The computer server may further comprise means for receiving a SUPL START message at the computer server after establishing the 5G NR data connection between the computer server and the UE. The computer server may further comprise means for sending a SUPL INIT message to the UE, and wherein the means for establishing the 5G NR data connection between the UE and the computer server is configured to do so in response to the UE receiving the SUPL INIT message.

An example non-transitory computer-readable medium, according to this description, includes instructions embedded thereon for supporting location of a UE using a SUPL session over a 5G NR data connection. The instructions, when executed by one or more processing units of an SLP, cause the SLP to: establish the 5G NR data connection between the SLP and the UE and receive a SUPL message from the UE as part of the SUPL session, the SUPL message comprising a LID parameter having a Long-Term Evolution (LTE) Cell Information data field. Cell data is included in the LTE Cell Information data field, and the cell data comprises information regarding a 5G NR serving cell of the UE or an LTE neighbor cell. The instructions, when executed by one or more processing units of an SLP, further cause the SLP to determine a location of the UE based at least in part on the cell data.

Alternative embodiments of the non-transitory computer-readable medium may include one or more the following features. The instructions, when executed by the one or more processing units of the SLP, may further cause the SLP to identify an indication in the LTE Cell Information data field indicating the presence of the information regarding the 5G NR serving cell of the UE. The instructions, when executed by the one or more processing units of the SLP, then further cause the SLP to send a SUPL INIT message to the UE, and establishing the 5G NR data connection between the UE and the SLP may be in response to the UE receiving the SUPL INIT message.

FIG. 6 illustrates an embodiment of a UE 105, which can be utilized as described herein above (e.g. in association with FIGS. 1-5). For example, the UE 105 can perform one or more of the functions of method 400 of FIG. 4. It should be noted that FIG. 6 is meant to provide a generalized illustration of various components, any or all of which may be utilized as appropriate. It can be noted that, in some instances, components illustrated by FIG. 6 can be localized to a single physical device and/or distributed among various networked devices, which may be disposed at different physical locations (e.g., located at different parts of a user's body, in which case the components may be communicatively connected via a Personal Area Network (PAN) and/or other means).

The UE 105 is shown comprising hardware elements that can be electrically coupled via a bus 605 (or may otherwise be in communication, as appropriate). The hardware elements may include a processing unit(s) 610 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 6, some embodiments may have a separate Digital Signal Processor (DSP) 620, depending on desired functionality. Location determination and/or other determinations based on wireless communication may be provided in the processing unit(s) 610 and/or wireless communication interface 630 (discussed below). The UE 105 also can include one or more input devices 670, which can include without limitation a keyboard, touch screen, a touch pad, microphone, button(s), dial(s), switch(es), and/or the like; and one or more output devices 615, which can include without limitation a display, light emitting diode (LED), speakers, and/or the like.

The UE 105 may also include a wireless communication interface 630, which may comprise without limitation a modem, a network card, an infrared communication device, a wireless communication device, and/or a chipset (such as a Bluetooth® device, an IEEE 802.11 device, an IEEE 802.15.4 device, a WiFi device, a WiMax device, a WAN device and/or various cellular devices, etc.), and/or the like, which may enable the UE 105 to communicate via the networks described above with regard to FIG. 1. The wireless communication interface 630 may permit data and signaling to be communicated (e.g. transmitted and received) with a 4G LTE and/or 5G NR network as described herein, for example, via eNBs, gNBs, ng-eNBs, access points, various base stations and/or other access node types, and/or other network components, computer systems, and/or any other electronic devices described herein. The communication can be carried out via one or more wireless communication antenna(s) 632 that send and/or receive wireless signals 634.

Depending on desired functionality, the wireless communication interface 630 may comprise separate transceivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) network, and so on. A CDMA network may implement one or more radio access technologies (RATs) such as CDMA2000, Wideband CDMA (WCDMA), and so on. Cdma2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 640. Sensors 640 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to complement and/or facilitate the position determination described herein, in some instances.

Embodiments of the UE 105 may also include a GNSS receiver 680 capable of receiving signals 684 from one or more GNSS satellites (e.g., SVs 190) using an antenna 682 (which could be the same as antenna 632). Positioning based on GNSS signal measurement can be utilized to complement and/or incorporate the techniques described herein. The GNSS receiver 680 can determine or help determine a position of the UE 105, using conventional techniques, from GNSS SVs of a GNSS system (e.g., SVs 190 of FIG. 1), such as Global Positioning System (GPS), Galileo, Glonass, Quasi-Zenith Satellite System (QZSS) over Japan, IRNSS over India, Beidou over China, and/or the like. Moreover, the GNSS receiver 680 can be used with various augmentation systems (e.g., a Satellite Based Augmentation System (SBAS)) that may be associated with or otherwise enabled for use with one or more global and/or regional navigation satellite systems, such as, e.g., WAAS, EGNOS, Multi-functional Satellite Augmentation System (MSAS), and Geo Augmented Navigation system (GAGAN), and/or the like.

The UE 105 may further include and/or be in communication with a memory 660. The memory 660 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 660 of the UE 105 also can comprise software elements (not shown in FIG. 6), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 660 that are executable by the UE 105 (and/or processing unit(s) 610 or DSP 620 within UE 105). In an aspect, then, such code and/or instructions can be used to configure and/or adapt a general purpose computer (or other device) to perform one or more operations in accordance with the described methods.

FIG. 7 illustrates an embodiment of a computer system 700, which may be utilized and/or incorporated into one or more components of a communication system (e.g., communication system 100 of FIG. 1), including various components of a 5G network, such as the NG-RAN 112, 5GCN 140 or 150, and/or similar components of other network types. FIG. 7 provides a schematic illustration of one embodiment of a computer system 700 that can perform the methods provided by various other embodiments, such as the methods described in relation to FIGS. 1-5. It should be noted that FIG. 7 is meant to provide a generalized illustration of various components, any or all of which may be utilized as appropriate. FIG. 7, therefore, broadly illustrates how individual system elements may be implemented in a relatively separated or relatively more integrated manner. In addition, it can be noted that components illustrated by FIG. 7 can be localized to a single device and/or distributed among various networked devices, which may be disposed at different physical or geographical locations. In some embodiments, the computer system 700 may correspond to an H-SLP (e.g. H-SLP 149) or another SLP (e.g. such as a V-SLP, D-SLP or E-SLP), a gNB 110 (e.g. gNB 110-1), another cellular or non-cellular access node, a UDM 142, and H-SMF 145, and/or some other type of location-capable device.

The computer system 700 is shown comprising hardware elements that can be electrically coupled via a bus 705 (or may otherwise be in communication, as appropriate). The hardware elements may include processing unit(s) 710, which can include without limitation one or more general-purpose processors, one or more special-purpose processors (such as digital signal processing chips, graphics acceleration processors, and/or the like), and/or other processing structure, which can be configured to perform one or more of the methods described herein, including the method described in relation to FIG. 5. The computer system 700 also can include one or more input devices 715, which can include without limitation a mouse, a keyboard, a camera, a microphone, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 700 may also include a communications subsystem 730, which can include support of wireline communication technologies and/or wireless communication technologies (in some embodiments) managed and controlled by a wireless communication interface 733. The communications subsystem 730 may include a modem, a network card (wireless or wired), an infrared communication device, a wireless communication device, and/or a chipset, and/or the like. The communications subsystem 730 may include one or more input and/or output communication interfaces, such as the wireless communication interface 733, to permit data and signaling to be exchanged with a network, mobile devices, other computer systems, and/or any other electronic devices described herein. Note that the terms "mobile device" and "UE" are used interchangeably herein to refer to any mobile communications device such as, but not limited to, mobile phones, smartphones, wearable devices, mobile computing devices (e.g., laptops, PDAs, tablets), embedded modems, and automotive and other vehicular computing devices.

In many embodiments, the computer system 700 will further comprise a working memory 735, which can include a RAM and/or or ROM device. Software elements, shown as being located within the working memory 735, can include an operating system 740, device drivers, executable libraries, and/or other code, such as application(s) 745, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 5, may be implemented as code and/or instructions that are stored (e.g. temporarily) in working memory 735 and are executable by a computer (and/or a processing unit within a computer such as processing unit(s) 710); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 725 described above. In some cases, the storage medium might be incorporated within a computer system, such as computer system 700. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a Random Access Memory (RAM), a Programmable Read-Only Memory (PROM), Erasable Programmable Read-Only Memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method at a User Equipment (UE) of supporting location of the UE using a Secure User Plane Location (SUPL) session over a secure data connection, the method comprising:
    establishing a secure data connection between the UE and a SUPL Location Platform (SLP) via a Fifth Generation (5G) New Radio (NR) serving cell of the UE;
    determining cell data, the cell data comprising information regarding the 5G NR serving cell of the UE; and
    sending a SUPL message to the SLP as part of the SUPL session, the SUPL message comprising a Location ID (LID) parameter having a Long-Term Evolution (LTE) Cell Information data field, wherein the cell data comprising the information regarding the 5G NR serving cell of the UE is included in the LTE Cell Information data field of the LID parameter of the SUPL message.

2. The method of claim 1, further comprising including an indication in the LTE Cell Information data field indicating a presence of the information regarding the 5G NR serving cell of the UE.

3. The method of claim 2, wherein the information regarding the 5G NR serving cell of the UE comprises a 5G NR Physical Cell ID, a 5G NR cell global ID, or a 5G NR Tracking Area code, or any combination.

4. The method of claim 3, wherein the information regarding the 5G NR serving cell of the UE is encoded using one or more parameters in the LTE Cell Information data field.

5. The method of claim 3 wherein at least some of the information regarding the 5G NR serving cell of the UE is truncated.

6. The method of claim 2, wherein the indication of the presence of the information regarding the 5G NR serving cell of the UE comprises a reserved value or a reserved bit sequence for a parameter in the LTE Cell Information data field.

7. The method of claim 1 wherein the UE initiates the SUPL session, wherein the SUPL message comprises a SUPL START message or a SUPL POS INIT message.

8. The method of claim 1, wherein the SLP initiates the SUPL session, and further comprising receiving a SUPL INIT message from the SLP, wherein establishing the secure data connection between the UE and the SLP is in response to receiving the SUPL INIT message.

9. The method of claim 8, wherein the SUPL message comprises a SUPL POS INIT message.

10. A User Equipment (UE) comprising:
    a communication interface;
    a memory; and
    one or more processing units communicatively coupled with the memory and the communication interface and configured to:
        establish, using the communication interface, a secure data connection between the UE and a Secure User Plane Location (SUPL) Location Platform (SLP) via a Fifth Generation (5G) New Radio (NR) serving cell of the UE;
        determine cell data, the cell data comprising information regarding the 5G NR serving cell of the UE; and
        send, using the communication interface, a SUPL message to the SLP as part of a SUPL session, the SUPL message comprising a Location ID (LID) parameter having a Long-Term Evolution (LTE) Cell Information data field, wherein the cell data comprising the information regarding the 5G NR serving cell of the UE is included in the LTE Cell Information data field of the LID parameter of the SUPL message.

11. The UE of claim 10, wherein the information regarding the 5G NR serving cell of the UE includes an indication in the LTE Cell Information data field indicating presence of the information regarding the 5G NR serving cell of the UE.

12. The UE of claim 11, wherein the information regarding the 5G NR serving cell of the UE includes a 5G NR Physical Cell ID, a 5G NR cell global ID, or a 5G NR Tracking Area code, or any combination.

13. The UE of claim 12, wherein the one or more processing units configured to encode the information regarding the 5G NR serving cell of the UE are configured to use one or more parameters in the LTE Cell Information data field.

14. The UE of claim 12, wherein the one or more processing units are configured to truncate at least some of the information regarding the 5G NR serving cell of the UE.

15. The UE of claim 11, wherein the indication of the presence of the information regarding the 5G NR serving cell of the UE comprises a reserved value or a reserved bit sequence for a data field in the LTE Cell Information data field.

16. The UE of claim 10, wherein the one or more processing units are further configured to initiate the SUPL session, and wherein the SUPL message comprises a SUPL START message or a SUPL POS INIT message.

17. The UE of claim 10, wherein the one or more processing units are configured to establish the secure data connection between the UE and the SLP are configured to establish the secure data connection between the UE and the SLP in response to receiving a SUPL INIT message from the SLP.

18. The UE of claim 17, wherein the SUPL message comprises a SUPL POS INIT message.

19. A mobile device comprising:
means for establishing a secure data connection between the mobile device and a Secure User Plane Location (SUPL) Location Platform (SLP) via a Fifth Generation (5G) New Radio (NR) serving cell of the UE;
means for determining cell data, the cell data comprising information regarding the 5G NR serving cell of the mobile device; and
means for sending a SUPL message to the SLP as part of a SUPL session, the SUPL message comprising a Location ID (LID) parameter having a Long-Term Evolution (LTE) Cell Information data field, wherein the cell data comprising the information regarding the 5G NR serving cell of the mobile device is included in the LTE Cell Information data field of the LID parameter of the SUPL message.

20. The mobile device of claim 19, further comprising means for including an indication in the LTE Cell Information data field indicating presence of the information regarding the 5G NR serving cell of the mobile device.

21. The mobile device of claim 20, further comprising means for encoding the information regarding the 5G NR serving cell of the mobile device using one or more parameters in the LTE Cell Information data field.

22. The mobile device of claim 20, wherein the means for including the indication in the LTE Cell Information data field comprises means for including, in the indication, a reserved value or a reserved bit sequence for a parameter in the LTE Cell Information data field.

23. The mobile device of claim 19, further comprising means for sending a SUPL START message to the SLP after establishing the secure data connection between the mobile device and the SLP.

24. A non-transitory computer-readable medium having instructions embedded thereon for supporting location of a User Equipment (UE) using a Secure User Plane Location (SUPL) session over a secure data connection, wherein the instructions, when executed by one or more processing units of the UE, cause the UE to:

establish the secure connection between the UE and a SUPL Location Platform (SLP) via a Fifth Generation (5G) New Radio (NR) serving cell of the UE;

determine cell data, the cell data comprising information regarding the 5G NR serving cell of the UE; and send a SUPL message to the SLP as part of the SUPL session, the SUPL message comprising a Location ID (LID) parameter having a Long-Term Evolution (LTE) Cell Information data field, wherein the cell data comprising the information regarding the 5G NR serving cell of the UE is included in the LTE Cell Information data field of the LID parameter of the SUPL message.

25. The non-transitory computer-readable medium of claim 24 further comprising instructions, when executed by the one or more processing units of the UE, which cause the UE to send a SUPL START message to the SLP after establishing the secure data connection between the UE and the SLP.

26. The non-transitory computer-readable medium of claim 24, further comprising instructions, when executed by the one or more processing units of the UE, which cause the UE to receive a SUPL INIT message from the SLP, wherein establishing the secure data connection between the UE and the SLP is in response to receiving the SUPL INIT message.

* * * * *